United States Patent
Hall et al.

(10) Patent No.: US 7,092,945 B2
(45) Date of Patent: Aug. 15, 2006

(54) METHOD AND SYSTEM FOR OBTAINING A USER'S PERSONAL ADDRESS INFORMATION

(75) Inventors: John M. Hall, Boise, ID (US); Christopher H. Williams, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 624 days.

(21) Appl. No.: 10/056,921

(22) Filed: Oct. 25, 2001

(65) Prior Publication Data
US 2003/0084050 A1    May 1, 2003

(51) Int. Cl.
*G06F 7/00* (2006.01)
*G06F 17/30* (2006.01)
*G06F 15/16* (2006.01)
*H04N 1/00* (2006.01)

(52) U.S. Cl. .................. 707/10; 707/9; 709/203; 358/403

(58) Field of Classification Search ............ 707/9, 707/10; 709/203; 358/403
See application file for complete search history.

(56) References Cited

U.S. PATENT DOCUMENTS 5,732,126 A * 3/1998 Fitzpatrick et al. ...... 379/88.17
6,049,796 A * 4/2000 Siitonen et al. ............ 707/3
6,304,898 B1 * 10/2001 Shiigi .................... 709/206
6,577,907 B1 * 6/2003 Czyszczewski et al. .... 700/17
6,609,121 B1 * 8/2003 Ambrosini et al. ........ 707/3
6,775,262 B1 * 8/2004 Skog et al. .............. 370/349
6,947,404 B1 * 9/2005 Zalka .................... 370/338

OTHER PUBLICATIONS

HP 9100c Digital Sender User Guide, Chapter 3 "Using the HP Address Book Manager," pp. 51-78.
http://www.faqs.org./rfcs/rfc1823.html, "The LDAP Application Program Interface," pp. 1-17.

* cited by examiner

*Primary Examiner*—Don Wong
*Assistant Examiner*—Cheryl M Shechtman

(57) ABSTRACT

A method and system is provided for facilitating the retrieval of data from a database using a communications device where the database is stored remotely from the communications device. A communications device using the method or system may obtain remote data, such as e-mail addresses, facsimile numbers, phone numbers, or uniform resource locators, from a user's remotely stored personal database.

15 Claims, 3 Drawing Sheets

METHOD AND SYSTEM FOR OBTAINING A USER'S PERSONAL ADDRESS INFORMATION

FIELD OF THE INVENTION

The present invention generally relates to a method and system for obtaining data, such as personal address information, from a remote location. More particularly, the present invention relates to a method for obtaining a person's personal data stored at a remote location using a communications device, for operating the communications device.

BACKGROUND OF THE INVENTION

The push towards the paperless office has begun. Likewise, personal use of paperless communications, such as e-mail, is on the rise. The widespread expansion of the use of paperless communications in the electronic and computer industries has resulted in the development of a number of communications devices, such as single function and multifunction products, for facilitating such communications. For example, e-mail, digital images, facsimiles, and the like may be transmitted between communications devices to facilitate paperless communications.

Single function products include communications devices used specifically for single purposes, such as sending digital images. For example, the Hewlett-Packard HP 9100C Digital Sender is a good example of a single function product. The HP 9100C Digital Sender is used to convert black-and-white or color documents, images, or photographs, to digital or electronic images for transmission in electronic format.

Multifunction products include communications devices such as e-mail enabled printers and facsimile devices, digital imaging devices, and the like. For example, the Hewlett-Packard HP LaserJet 8150 mfp is a good example of a multifunction product. The HP LaserJet 8150 mfp provides high-performance network printing, copying, and digital sending capabilities in a single package for use with network systems or enterprise environments.

Single and multifunction products typically transmit electronic communications, such as e-mail, digital images, facsimiles, or the like. The user of the product may enter the address, or destination, for such transmissions. For example, a user desiring to send a copy of a document as a facsimile to a particular phone number could enter the phone number into the product using a keypad, or other input device, associated with the product. Alternatively, the user could select a phone number from a database stored in a memory of the single or multifunction product. Once the phone number is entered, or selected, the communications device attempts to deliver the facsimile to the designated phone number.

In those instances where the user is able to select a desired destination for a transmission—be it a facsimile, e-mail, or other electronic communication—from a database, the database is stored in a memory of the communications device. The database may be read or accessed using one of many different programs. One such database includes HP Address Book Manager that may be installed or incorporated with communications devices. The HP Address Book Manager provides access to a database storing public and private e-mail lists, facsimile numbers, and distribution lists. Any user may access the public lists whereas private lists may only be accessed by registered users using a login process. Each private list stores only a limited amount of data. Typically, the user must manually enter the data into their private lists for storage by a database used by the HP Address Book Manager. However, a user may also import data to a database accessed by the HP Address Book Manager if the communications device has been configured to receive such data. Once received, the data may be stored in the database.

One of the disadvantages of database systems used with communications devices is the limited amount of storage space available to each user. Thus, a user may be unable to store all of the e-mail addresses, or facsimile numbers, that they need, or use, on a regular basis. As a result, the user may have to repetitively enter data into the database using the single or multifunction product. A further disadvantage is the inability of to share data with other devices or programs. Although a user may be able to import data into their private lists, the amount of importable data is limited. In addition, if the user's system is not configured for importing data, manual re-entry of the data is required to store the data within the memory of a single or multifunction product.

The limitations associated with current data storage systems available to communications devices hinder the user friendliness of such devices. A system and method for providing devices with access to databases for obtaining communications information or data may be more effective than the current programs that require storage of such information in the memory of a communications device, such as a single function or multifunction device.

SUMMARY OF THE INVENTION

The present invention generally relates to a method and system for obtaining data, such as personal address information, from a remote location. More particularly, the present invention relates to a method for obtaining a person's personal data stored at a remote location using a communications device, for operating the communications device.

In one embodiment of the present invention, a method is provided for allowing a user of a communications device, such as a single function or multifunction product, to access a personal database stored at a remote location from the communications device. For example, an address book stored on a user's computer may be accessed using the communications device. Access to a personal database may be used for directing a communication from the communications device to another device. In this embodiment, a communications device is provided for creating, transmitting, or receiving electronic communications. It is understood that the communications device may be a single function product, a multifunction product, or other device capable of sending or receiving electronic communications. Preferably, the communications device is networked to facilitate communications with other communications devices and networked devices. The communications device may include hardware or software for communicating with other devices such as Lightweight Directory Access Protocol (LDAP) interfaces or other directory servers. In addition, the communications device may include an input device for identifying the user of the communications device. Identification of a user of the communications device may be used to retrieve information about the location of a user's personal database for accessing the personal database and providing the user with desired e-mail addresses, facsimile numbers, uniform resource locaters, or the like.

The present invention provides a communications device user access to a personal database from which they may select addresses, phone numbers, or other identifying data that may be used to direct a communication sent by the communications device. Simply, the communications device user validates their identity to the communications device, for example, by providing the communications device a secure identification unique to the user. Using a directory server, such as an LDAP interface, to an Exchange or compatible server, the user's LDAP entry is determined from the secure identification. The user's LDAP entry is parsed to determine a unique identifier (UID) field and a home message transfer agent (MTA) field. A server storing the user's personal database may be determined by parsing the MTA field. Once the server is located, such as by obtaining a server name or uniform resource locator, a Messaging Application Program Interface (MAPI) profile, or other communications profile, is created from the UID and server name. The profile may then be used to obtain the user's data from the user's personal database. For example, information, or data, from a user's personal address book, contact list, or other data storage program stored at a remote location to a communications device, may be obtained using the present invention. This data may then be used to route or send an electronic communication using the communications device.

The methods and system of the present invention provide benefits heretofore unavailable in communications devices. Repetitive entry of previously stored or created data is eliminated because a communications device using the present invention is able to access a user's personal database. Communications device memory space is also saved because repetitive data is not stored by the communications device or on a network. Furthermore, users are not limited to finite personal data lists stored on a communications device. Instead, users may access a single personal database stored in a central location accessible to the user. The present invention allows a user to maintain a single database, including contact information, and eliminates the need for memorizing vast amounts of contact information or the repetitive entry of such data into communications devices or other devices.

DESCRIPTION OF THE DRAWINGS

While the specification concludes with claims particularly pointing out and distinctly claiming that which is regarded as the present invention, the present invention can be more readily ascertained from the following description of the invention when read in conjunction with the accompanying drawings in which:

DETAILED DESCRIPTION OF THE INVENTION

The present invention generally relates to a method and system for obtaining data, such as personal address information, from a remote location. More particularly, the present invention relates to a method for obtaining a person's personal data stored at a remote location using a communications device, for operating the communications device.

The present invention provides a utility, such as a computer program or hardware function, operating on, or through, a communications device for retrieving data from a remote location accessible to a user. Using the methods and system of the present invention, a user may access a database, such as a personal address book, from a remote storage media and use the retrieved data to operate the multifunction device.

Figure 1:
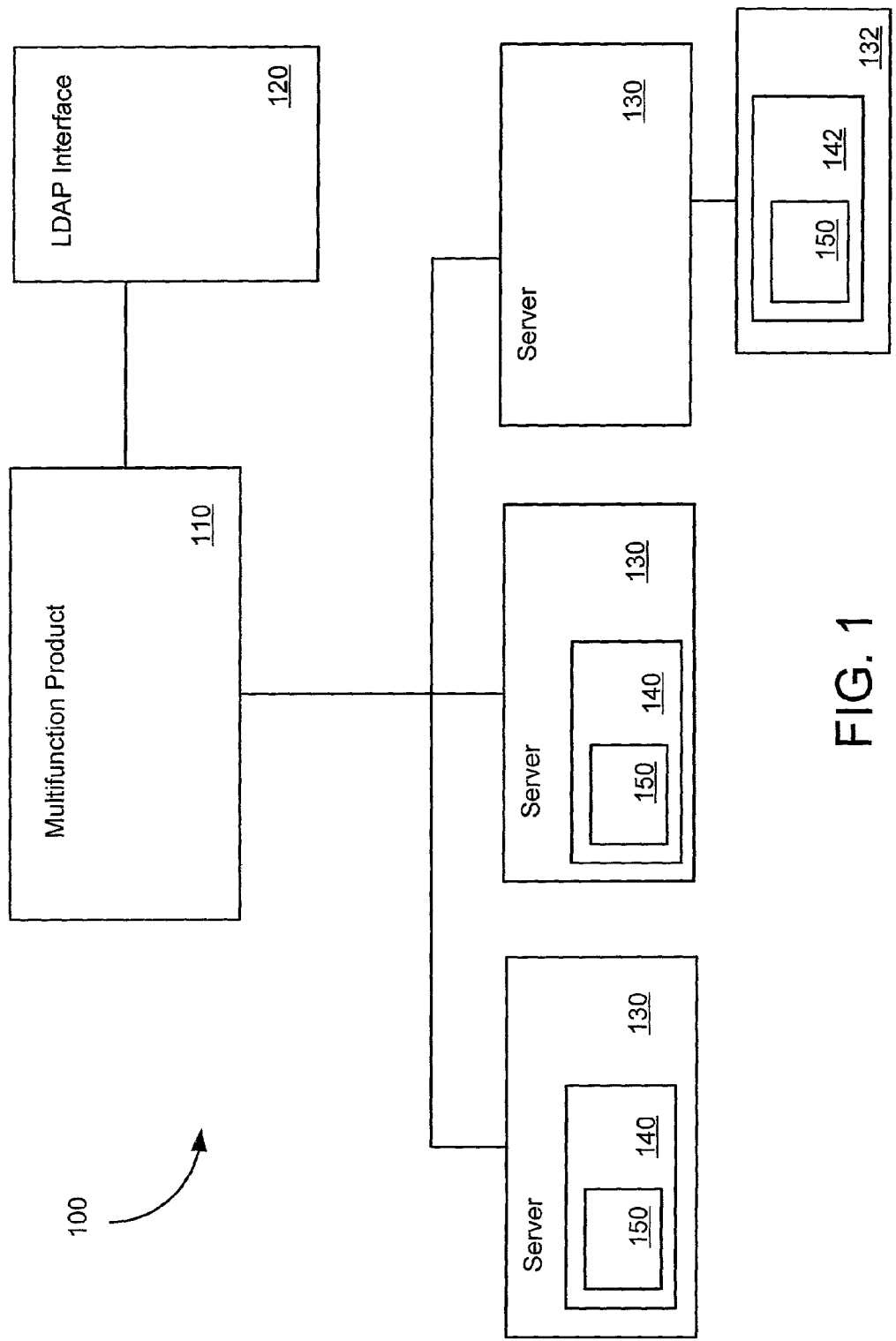
FIG. 1 illustrates a block diagram of one embodiment of the system for accessing remote data from a communications device of the present invention.

The present invention may be more readily understood with reference to FIG. 1, wherein a system 100 for operating one embodiment of the present invention is illustrated. A communications device 110 may be configured for communicating with a Lightweight Directory Access Protocol (LDAP) interface 120, and one or more servers 130. Each server 130 may include storage media 140 for storing data for particular users, such as a personal database 150. Alternatively, servers 130 may have access to a user's individual storage media 142 on a remote device 132, such as a personal computer, where a personal database 150 may be stored.

Communications devices 110 used with the system 100 of the present invention may include single function or multifunction devices such as digital senders, e-mail enabled printers, e-mail enabled servers, multifunction facsimile/e-mail devices and the like. Essentially, any device capable of e-mailing, sending facsimiles, or communicating via other paperless communication methods, qualifies as a communications device 110 that may be incorporated with the system 100 of the present invention.

The LDAP interface 120 incorporated with the system 100 of the present invention may be any LDAP interface 120 as known in the art. For example, an LDAP interface 120 may be an LDAP server hosting information and data about registered users in an enterprise environment, such as a computer network used by a business. The LDAP interface 120 may include information or data for identifying authorized users of the enterprise environment system to which a communications device 110 is connected. Using a LDAP interface 120, information about a user may be queried and retrieved, and passed back to the communications device 110 for later use. It is also understood that other directory services or servers capable of performing similar functions to those of an LDAP interface are also encompassed by the present invention.

Each server 130 in communication with a communications device 110 may be similar to those known in the art. Typically, servers 130 may include servers found on a network system. For example, a company may operate a number of servers 130 for particular purposes within the company. Each server 130 may be linked to a network for facilitating communications between the servers 130 and other devices connected to the network. A communications device 110 connected to such a network may have communication capabilities with one or more of the servers 130 connected to the network, such that information may be passed between a server 130 and a communications device 110.

Storage media 140 may be hosted by a server 130, or accessible to a server 130 through communications known in the art. Storage media 140 may include such things as hard disk drives, floppy drives and floppy disks, optical disks, compact discs, digital video disks, random access memory, read only memory, flash memory, or the like. Storage media 140 may include, or store, a user's personal database 150, such as an address book, a contact database, or other information accessible to a user.

The present invention provides a user operating a communications device 110 of the system 100 access to a personal database 150 stored on storage media 140 of a server 130, or on storage media 142 hosted by a remote device 132, from the communications device 110. This enables the user to retrieve stored data, such as e-mail addresses or facsimile phone numbers, from a personal database 150 for use with the functions of the communications device 110.

For instance, a user operating a communications device 110, such as the Hewlett-Packard HP LaserJet 8150 mfp, may wish to send a digital image to a number of other individuals via e-mail and facsimile. The communications device 110 requires the user to enter the desired e-mail addresses and facsimile numbers of the recipients. This may involve the entry of multiple sets of information if the list of intended recipients is extensive. Instead, using the system 100 of the present invention, a user may retrieve a list of desired recipients from their personal address book stored on a server 130 or a remote device 132. Using the system 100, a user may select the e-mail addresses and facsimile numbers of the intended recipients from their personal database 150.

Figure 2:
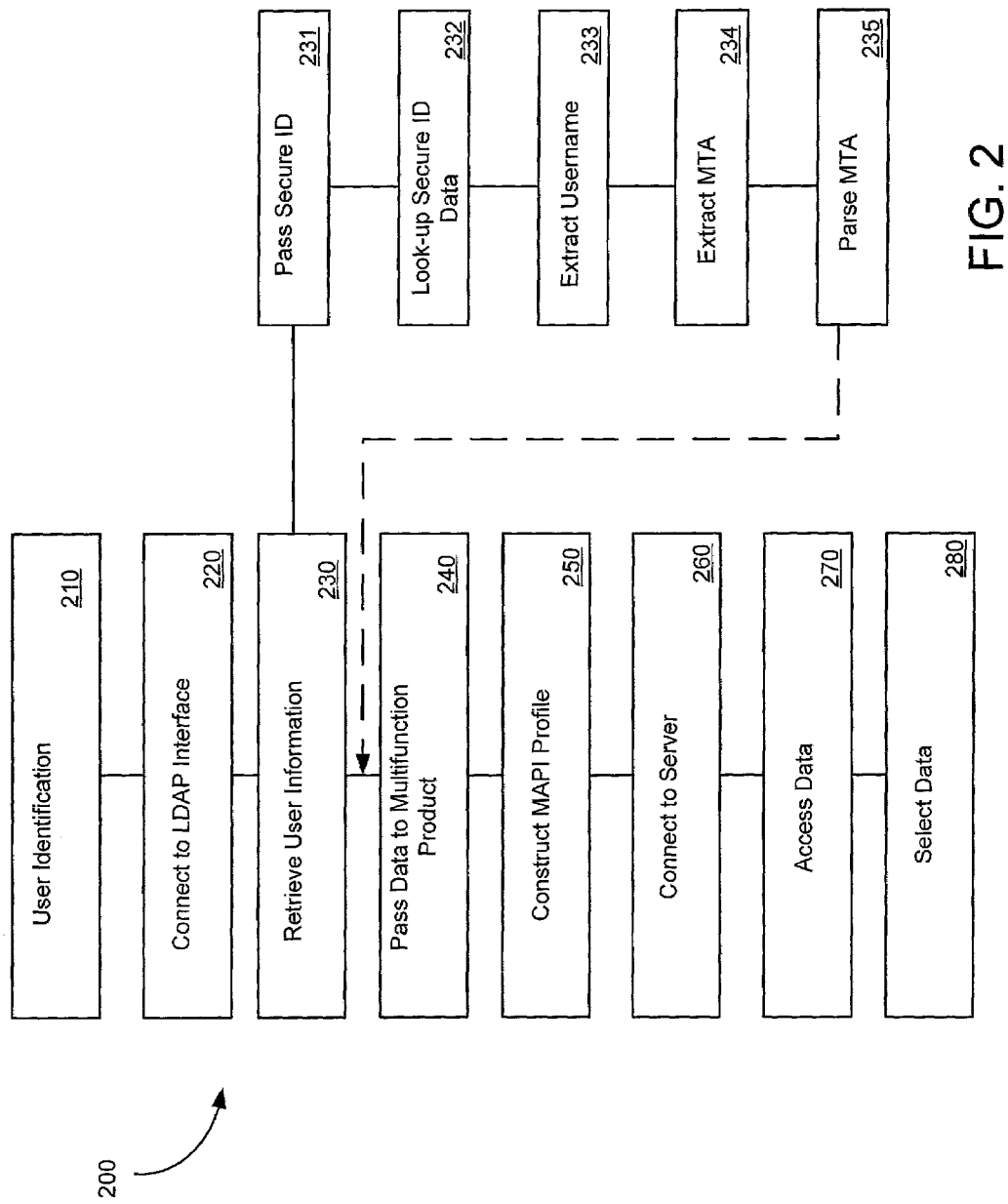
FIG. 2 illustrates a block diagram of the method steps performed using an embodiment of the present invention to retrieve remote data from a communications device.

FIG. 2 illustrates a block diagram of the method of the present invention using the system 100 illustrated in FIG. 1. Using the communications device 110, a user enters information that identifies the user 210 to the communications device 110. For example, a unique, secure identification string may be assigned to each user having access to, or authorized to use, a communications device 110. To access the communications device 110, a user enters their secure identification string into the communications device 110 using an input device. The communications device 110 may use the secure identification string to obtain additional information about the user, including the storage location of a user's personal database 150.

Once the user is identified 210, the communications device 110 may connect 220 to an LDAP interface 120 for determining additional information about the user of the communications device 110. The LDAP interface 120 is illustrated as a separate server in FIG. 1. It is understood, however, that a database may be stored in a memory of the communications device 110, or other server, to perform the same functions of the LDAP interface 120. Once connected to the LDAP interface 120, the communications device 110 requests and retrieves 230 additional information about the user from the LDAP interface 120. This information is then used to access the user's personal database 150. For example, to retrieve 230 the information necessary to access a user's personal database 150, the secure identification string is passed 231 to the LDAP interface 120. Using the secure identification string, the LDAP interface 120 looks-up user data 232 associated with the secure identification string. If information associated with the secure identification string is found, the LDAP interface 120 extracts the user's identification 233, which is typically the user's username for the server 130 that they are associated with. The LDAP interface 120 then extracts the message transfer agent (MTA) 234 from the information stored on the LDAP interface 120. The MTA is parsed 235 to determine the server upon which the user's personal database 150 is stored. Use of LDAP interfaces 120 to retrieve information such as a username and an MTA is known in the art.

The user information retrieved 230 from the LDAP interface 120 is passed 240 to the communications device 110. Using the information, the communications device 110 constructs a user profile 250, such as messaging application program interface (MAPI) profile, for retrieving data from the user's personal database 150. Typically, a MAPI profile is constructed from the username and server information retrieved from the LDAP interface 120. However, other types of user profiles for performing such communications may also be constructed. The construction, and use, of MAPI profiles are well known in the art.

Using a user profile, the communications device 110 connects 260 to the server 130 having access to the user's personal database 150. The communications device 110 uses the username in the user profile to login to the server 130 as the user of the communications device 110. The communications device 110 then accesses 270, or opens a dynamic connection to, the user's personal database 150 to provide the user of the communications device 110 access to the data stored in their personal database 150. The user may select data 280 from the user's personal database 150 to be used by the communications device 110. For instance, a user may select the e-mail addresses and facsimile numbers to be used by the communications device 110 for sending a document. Once selection 280 is complete, communication between the communications device 110 and the server 130 may be terminated if additional data is not needed. Typically, a user may terminate the connection using the communications device 110. If a user intends to send additional documents or information from the communications device 110, the connection between the communications device 110 and the server 130 may be maintained so that the user may access additional data from their personal database 150.

Use of the system 100 of the present invention may be better understood by the following example: A user wishing to send a picture to three individuals scans the picture using a communications device 110. The scanned image is stored by the communications device 110 as a data file that may be transmitted as an e-mail attachment, or as a facsimile, as known in the art. The user chooses to access their personal database 150, an address book, stored on storage media 140 hosted by a server 130 remote to the communications device 110, to retrieve the e-mail addresses of two of the individuals, and the facsimile address of the third individual. Using the communications device 110, the user enters their secure identification string. If the secure identification string is recognized by the communications device 110 as belonging to a user having access to the communications device 110, the user is allowed to use the communications device 110.

Using the secure identification string, the communications device 110 connects to a directory service, such as an LDAP interface 120, to search for user information associated with the secure identification string. Based upon the user's secure identification string, the LDAP interface 120 determines the username of the user and extracts the MTA identifying the server where the user's personal database 150 is stored. The location of the server, or the server name, is parsed from the MTA and passed to the communications device 110 along with the username of the user. The connection between the communications device 110 and the LDAP interface 120 may be terminated following retrieval of such information.

The communications device 110, having obtained the server name, connects to the server and logs in as the user, using the username retrieved from the LDAP interface 120. Once logged in, the communications device 110 provides the user access to the user's personal database 150. The user selects two e-mail addresses from their personal database 150 and one facsimile number. The communications device 110 uses the selected e-mail addresses and facsimile number as the destination locations to which the scanned image created by the user are to be sent. The communications device 110 attaches an electronic copy of the scanned image to an e-mail message that is sent to each of the selected e-mail addresses from the user's personal database 150. The communications device 110 also sends a facsimile of the scanned image to the facsimile number selected by the user.

The connection between the communications device 110 and the user's personal database 150 may be terminated if the user does not wish to continue to use the communications device 110. However, if multiple projects are being undertaken with a communications device 110 at one time, the user may choose to maintain the connection between the communications device 110 and the user's personal database 150.

Figure 3:
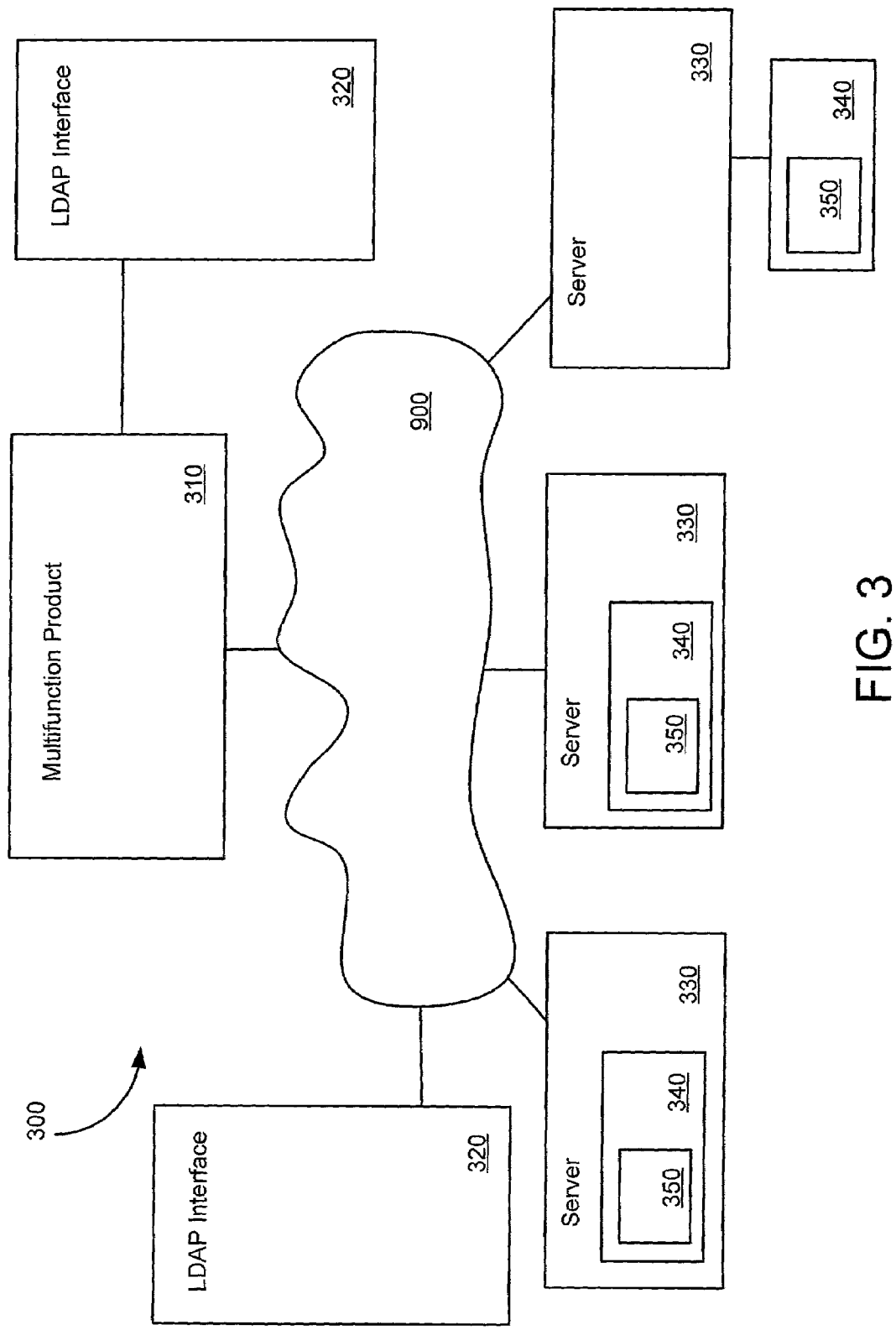
FIG. 3 illustrates an alternative embodiment of the system for accessing remote data from a communications device using an Internet connection.

In another embodiment of the present invention, the system 300 includes an Internet 900 portal. In this embodiment, illustrated in FIG. 3, the communications device 310 may be able to connect to the Internet 900. An LDAP interface 320 may be connected directly to the communications device 310 or accessible to the communications device 310 through the Internet 900. Similarly, the communications device 310 may be able to connect to servers 330 through an Internet 900 connection. This embodiment of the present invention provides a user of a communications device 310 access to a personal database 350 stored by storage media 340 hosted by a server 330 that may be accessed through an Internet 900 connection.

This embodiment of the present invention operates in a similar manner as that previously discussed. However, the server address obtained by the communications device 310 from a LDAP interface 320 may link the communications device 310 to a server 330 through the Internet 900. It is understood that a communications device 310 connection to a server 330 through the Internet 900 does not provide any significant variation to the direct connection previously explained. Using system 300, a user may access a personal database 350 stored on a remote server 330 through the Internet 900.

The system of the present invention greatly expands the capabilities of communications devices 110. Incorporating the present invention, a communications device 110 is not limited to a finite database of information stored by, or directly accessible to, the communications device 110. Instead, individual users may access personal databases 150 stored at remote locations to the communications device 110 for retrieving data to be used to operate the communications device 110. This allows a user to maintain a personal database 150, such as a personal address book, in one central location, that may be accessed from any communications devices 110 using the present invention. In enterprise applications, this greatly reduces the repetition of stored data because a user need not store e-mail addresses, facsimile numbers, and other information on each communications device 110 that the user may use.

Additionally, the automatic identification of a user's home server using the MTA determined from an LDAP interface 120, or other directory service, minimizes the amount of network traffic required for accessing a user's personal database 150. Having the username and the server identification, the configuration for the communication between the communications device 110 and the server 130 hosting the user's personal database 150 is also minimized, thereby reducing network traffic.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A method for sending data using a communications device, comprising:
   creating a data file for sending using said communications device;
   receiving, by the communications device, a user identifier of a user;
   communicating, by the communications device, with a first server that contains user information including associations between users and locations of personal databases;
   retrieving, from the first server, a location of a personal database associated to the user identifier where the location identifies a second server;
   establishing communication between the communications device and the second server and verifying that the user is authorized to login to the second server based on the user identifier,
   if the login is verified, allowing the user to search addresses from the personal database and to select at least one destination address;
   retrieving, from the second server, the at least one destination address from the personal database associated to the user identifier for sending said data file to said at least one address; and
   sending said data file to said at least one destination address.

2. The method of claim 1, wherein establishing communication between the communications device and the second server comprises:
   accessing the personal database of said user;
   logging onto the second server hosting a storage media for storing said personal database of said user associated to the user identifier;
   retrieving data from said personal database of said user; and
   displaying said retrieved data to said user trough said communications device.

3. The method of claim 2, wherein said logging onto the second server comprises connecting to said second server using the Internet.

4. The method of claim 1, wherein the first server includes a directory service and the method further comprises:
   prompting said user to enter the user identifier which includes a secure identification string into said communications device;
   connecting to said directory service; and
   determining said location of the second server from data associated with said secure identification string accessible to said directory service.

5. The method of claim 4, further comprising determining a username from data associated with said secure identification string accessible to said directory service.

6. The method of claim 4, wherein said directory service comprises a lightweight directory access protocol interface.

7. The method of claim 1, further including allowing the user to select the at least one destination address from a group consisting of e-mail addresses, facsimile numbers, phone numbers, and uniform resource locators.

8. A system for sending data from a communications device to a location defined by data in a user's personal database, comprising:
   a communications device for sending data to at least one specified address;

an interface for receiving a user identifier of a user to access the communications device;

means for communicating with a first server, the first server including user information comprising associations between user identifiers and locations of personal address databases;

means for retrieving, from the first server, a location of a personal address databases associated to the user identifier received from the interface, where the location identifies a second server that has access to the personal address database associated wit the user identifier;

the means for communicating being further configured for establishing communication between the system and the second server to allow access to the personal address database; and means for accessing the personal address database associated to the user identifier stored remotely from said communications device to retrieve the at least one specified address selected by the user from the personal address database.

9. The system of claim 8, further comprising a server for storing said personal address database.

10. The system of claim 9, where the means for communicating further comprising means for connecting to an Internet connection for facilitating communications between said communications device and said first server and said second server.

11. The system of claim 8, wherein said personal address database stored remotely from said communications device for storing addresses for receiving data is stored on a server in communication with said communications device.

12. The system of claim 8, wherein the first sewer further comprising a lightweight directory access protocol interface for storing information.

13. The system of claim 8 where the communications device is a printer or a multifunctional product comprising a facsimile.

14. A multifunctional device comprising:

a facsimile for transmitting facsimile communications to one or more destinations and for receiving facsimile communications;

means for receiving a user identifier of a user;

means for communicating with a first server, the first server including user information comprising associations between user identifiers and locations of personal address book databases;

means for retrieving, from the first server, a location of a personal address book database associated to the user identifier received from the means for receiving, where the location identifies a second sewer;

the means for communicating being further configured for establishing communication between the multifunctional device and the second server; and means for accessing the personal address book database via the second server maintained on a remote device from the multifunctional device and for retrieving address information from the personal address book database to be used as the one or more destinations by the facsimile when transmitting facsimile communications.

15. The multifunction device of claim 14 further including a printer operably connected to the facsimile and the means for accessing.

* * * * *

UNITED STATES PATENT AND TRADEMARK OFFICE
CERTIFICATE OF CORRECTION

| | |
|---|---|
| PATENT NO. | : 7,092,945 B2 |
| APPLICATION NO. | : 10/056921 |
| DATED | : August 15, 2006 |
| INVENTOR(S) | : John M. Hall et al. |

It is certified that error appears in the above-identified patent and that said Letters Patent is hereby corrected as shown below:

In column 8, line 21, in Claim 1, delete "identifier," and insert -- identifier; --, therefor.

In column 8, line 40, in Claim 2, delete "trough" and insert -- through --, therefor.

In column 9, line 8, in Claim 8, delete "databases" and insert -- database --, therefor.

In column 9, line 11, in Claim 8, delete "wit" and insert -- with --, therefor.

In column 9, line 32, in Claim 12, delete "sewer" and insert -- server --, therefor.

In column 10, line 18, in Claim 14, delete "sewer;" and insert -- server; --, therefor.

Signed and Sealed this

Twenty-sixth Day of May, 2009

JOHN DOLL
*Acting Director of the United States Patent and Trademark Office*